United States Patent
Takada

(10) Patent No.: US 9,956,819 B2
(45) Date of Patent: May 1, 2018

(54) METHOD FOR ASSEMBLING WHEEL BEARING APPARATUS

(71) Applicant: JTEKT CORPORATION, Osaka-shi, Osaka (JP)

(72) Inventor: Yoshito Takada, Nara (JP)

(73) Assignee: JTEKT CORPORATION, Osaka-shi (JP)

(*) Notice: Subject to any disclaimer, the term of this patent is extended or adjusted under 35 U.S.C. 154(b) by 91 days.

(21) Appl. No.: 15/159,416

(22) Filed: May 19, 2016

(65) Prior Publication Data
US 2016/0348729 A1    Dec. 1, 2016

(30) Foreign Application Priority Data
May 28, 2015    (JP) .................................. 2015-108453

(51) Int. Cl.
| | | |
|---|---|---|
| *B60B 27/00* | (2006.01) | |
| *F16C 43/04* | (2006.01) | |
| *F16C 33/78* | (2006.01) | |
| *F16C 19/18* | (2006.01) | |

(52) U.S. Cl.
CPC ...... *B60B 27/0005* (2013.01); *F16C 33/7883* (2013.01); *F16C 43/045* (2013.01); *B60B 2310/30* (2013.01); *B60B 2320/10* (2013.01); *B60B 2380/12* (2013.01); *B60B 2900/113* (2013.01); *F16C 19/186* (2013.01); *F16C 2326/02* (2013.01)

(58) Field of Classification Search
CPC .............. B60B 27/0005; B60B 27/001; B60B 27/0015; B60B 27/0073; F16C 33/7876
See application file for complete search history.

(56) References Cited

U.S. PATENT DOCUMENTS

| | | | | |
|---|---|---|---|---|
| 7,857,521 B2* | 12/2010 | Umekida | .............. | B60B 27/001 384/565 |
| 2007/0076994 A1* | 4/2007 | Norimatsu | .............. | B60B 27/00 384/486 |
| 2007/0193032 A1* | 8/2007 | Takimoto | .............. | B60B 27/001 29/898 |

FOREIGN PATENT DOCUMENTS

| | | |
|---|---|---|
| JP | 2005-291485 A | 10/2005 |
| JP | 2007-127243 A | 5/2007 |

* cited by examiner

*Primary Examiner* — Jason L Vaughan
*Assistant Examiner* — Amanda Meneghini
(74) *Attorney, Agent, or Firm* — Oliff PLC

(57) ABSTRACT

A method for assembling a wheel bearing apparatus includes disposing a positioning jig such that a lateral face of the positioning jig on one side in an axial direction contacts a lateral face of a hub flange on a side of a slinger, the positioning jig having a ring shape separated into a plurality of partial portions arranged in a circumferential direction, a width of the positioning jig in the axial direction being equal to a distance between a lateral face of a disc portion on a side of the hub flange and a lateral face of the hub flange on the side of the slinger, the distance being set to obtain an appropriate interference; and attaching the slinger such that the lateral face of the disc portion on the side of the hub flange contacts a lateral face of the positioning jig on another side in the axial direction.

3 Claims, 4 Drawing Sheets

METHOD FOR ASSEMBLING WHEEL BEARING APPARATUS

INCORPORATION BY REFERENCE

The disclosure of Japanese Patent Application No. 2015-108453 filed on May 28, 2015 including the specification, drawings and abstract is incorporated herein by reference in its entirety.

BACKGROUND OF THE INVENTION

1. Field of the Invention

The invention relates to a method for assembling a wheel bearing apparatus used in a vehicle such as an automobile.

2. Description of Related Art

In a wheel bearing apparatus used in a vehicle such as an automobile, lubricant such as grease is provided in bearing inner space between an outer ring member and an inner ring member. In the case where muddy water or foreign matter intrudes into the bearing inner space, the degradation of grease, the formation of the rust of components, and reduction in the service life of bearing are caused. Therefore, in order to prevent the grease from leaking from the bearing inner space and prevent muddy water or foreign matter from intruding into the bearing inner space from an outside, the wheel bearing apparatus is provided with a sealing unit.

As a sealing unit for a wheel bearing apparatus, a hub seal commonly called a pack seal has been known. The hub seal includes a sealing member and a slinger. The sealing member is fixed at an opening at the end of the outer ring member. The sealing member includes at least two sealing lips including a side lip and a radial lip. The slinger is fixed to the slinger fitting face of the inner ring member. The slinger has an L-shaped section, and includes a cylindrical portion and a flat-plate portion (see Japanese Patent Application Publication No. 2005-291485 (JP 2005-291485 A)).

The side lip of the hub seal is in slide contact with the lateral face of the flat-plate portion of the slinger on the side of the bearing inner space, while the radial lip of the hub seal is slide contact with the outer periphery of the cylindrical portion of the slinger. The sealing member and the slinger are attached at the opening of the bearing inner space between the outer ring member and the inner ring member such that the end of the sealing member on a side opposite to the bearing inner space and the lateral face of the slinger on the side opposite to the bearing inner space are pressed at the same time.

Generally, in the hub seal, the interference between the side lip and the lateral face of the flat-plate portion of the slinger on the side of the bearing inner space is set such that the interference is an appropriate value when the end of the sealing member on the side opposite to the bearing inner space and the lateral face of the slinger on the side opposite to the bearing inner space are arranged on the same plane.

As a wheel bearing apparatus, a wheel bearing apparatus of a third-generation unit type including an attachment flange that is attached to a vehicle body and that is disposed on the vehicle inboard side of an outer ring member and including a wheel attachment hub flange disposed on the vehicle outboard side of a hub spindle serving as an inner ring member has been known. When the above-described hub seal is attached at an opening on the vehicle outboard side of the bearing inner space of the wheel bearing apparatus of the third-generation unit type, it is not possible to press the sealing member and the slinger from the vehicle outboard side at the same time to attach the sealing member and the slinger (see Japanese Patent Application Publication No. 2007-127243 (JP 2007-127243 A)).

In the step of assembling the hub seal attached to the vehicle outboard side of the wheel bearing apparatus of the third-generation unit type, the slinger is attached to the hub spindle in advance separately from the sealing member. However, in a structure in which the hub spindle has no means for restricting the position of the slinger in an axial direction, it is difficult to fix the slinger at an accurate position on the hub spindle in the axial direction. Therefore, an interference in the axial direction between the side lip and the slinger may be excessive or insufficient in the hub seal, and as a result, the sealing unit of the wheel bearing apparatus may not have sufficient sealing performance.

SUMMARY OF THE INVENTION

The invention provides a method for easily assembling a wheel bearing apparatus that is excellent in sealing performance, the method making it possible to prevent occurrence of excess and deficiency of an interference in an axial direction between a side lip and a slinger of a sealing unit in an assembling step.

An aspect of the invention relates to a method for assembling a wheel bearing apparatus. The wheel bearing apparatus includes an outer ring member that includes an outer ring raceway on an inner periphery thereof; a hub spindle that includes an inner ring raceway on an outer periphery thereof and includes a hub flange at an end thereof on one side in an axial direction, the hub flange extending outward in a radial direction such that a diameter of the hub spindle is increased at the hub flange; a plurality of rolling elements that roll between the outer ring raceway of the outer ring member and the inner ring raceway of the hub spindle; and a sealing unit that seals an opening of bearing inner space on a side of the hub flange, the bearing inner space being provided between the outer ring member and the hub spindle, the sealing unit including a slinger made of metal and a sealing member that includes a core made of metal and a sealing portion made of synthetic rubber, the slinger including a cylindrical portion that is press-fitted to a shoulder outer peripheral face between the inner ring raceway and the hub flange in the hub spindle, and including a disc portion that extends outward in the radial direction from an end of the cylindrical portion on the side of the hub flange such that a diameter of the slinger is increased at the disc portion, the sealing portion including a side lip that faces the disc portion and extends toward the disc portion such that a diameter of the side lip increases toward the disc portion, and an end of the side lip on a side of the disc portion being in slide contact with a lateral face of the disc portion on a side of the sealing portion with an appropriate interference. The method includes disposing a positioning jig such that a lateral face of the positioning jig on the one side in the axial direction is in contact with a lateral face of the hub flange on a side of the slinger, the positioning jig having a ring shape separated into a plurality of partial portions arranged in a circumferential direction, a width of the positioning jig in the axial direction being equal to a distance between a lateral face of the disc portion on the side of the hub flange and the lateral face of the hub flange on the side of the slinger, and the distance being set to obtain the appropriate interference; and attaching the slinger such that the lateral face of the disc portion on the side of the hub flange is in contact with a lateral face of the positioning jig on another side in the axial direction.

The above aspect of the invention relates to the method for assembling the wheel bearing apparatus, the wheel bearing apparatus including the hub flange that is disposed on one side in the axial direction, i.e., on a vehicle outboard side, and extends outward in the radial direction such that the diameter of the hub spindle is increased at the hub flange; and the sealing unit that seals the opening of the bearing inner space on the side of the hub flange, i.e., on the vehicle outboard side. The sealing portion of the sealing unit includes the side lip, and the end of the side lip on the side of the disc portion of the stinger, i.e., on the vehicle outboard side is slide contact with the lateral face of the disc portion of the slinger on the side of the sealing portion, i.e., on the vehicle inboard side with an interference in the axial direction.

In addition, the distance between the lateral face of the disc portion of the slinger on the vehicle outboard side and the lateral face of the hub flange on the side of the slinger, i.e., on the vehicle inboard side is set such that the interference in the axial direction becomes an appropriate interference. In the step of attaching the slinger to the hub spindle in the assembling method according to the above aspect of the invention, the positioning jig having a width in the axial direction that is equal to the distance between the lateral face of the disc portion on the vehicle outboard side and the lateral face of the hub flange on the vehicle inboard side is used.

The slinger is disposed such that the lateral face of the positioning jig on the one side is in contact with the lateral face of the hub flange on the vehicle inboard side. The slinger is moved toward the vehicle outboard side to be press-fitted to the shoulder outer peripheral face of the hub spindle. The attachment of the slinger is finished when the slinger is moved to the vehicle outboard side and the lateral face of the disc portion of the slinger on the vehicle outboard side comes in contact with the lateral face of the positioning jig on the other side in the axial direction.

The distance between the lateral face of the disc portion of the slinger on the vehicle outboard side and the lateral face of the hub flange on the vehicle inboard side is accurately maintained and variation in the distance is not caused, since the slinger is press-fitted to the hub spindle as described above. Therefore, in the step of attaching the slinger to the hub spindle, it is possible to prevent the occurrence of the excess and deficiency of the interference in the axial direction between the end of the side lip on the vehicle outboard side and the lateral face of the disc portion of the slinger on the vehicle inboard side.

Moreover, since the positioning jig is separated into the plurality of portions arranged in the circumferential direction, the plurality of partial portions of the positioning jig are movable in the radial direction. Therefore, after the attachment of the slinger is finished, the plurality of partial portions of the positioning jig can be easily separated from (i.e., moved away from) the hub spindle by moving the plurality of partial portions outward in the radial direction.

In the above aspect, the positioning jig may have the ring shape separated into two partial portions arranged in the circumferential direction; and the two partial portions of the positioning jig may be disposed by moving the two partial portions symmetrically with respect to the hub spindle in the radial direction.

With the above configuration, the positioning jig has the ring shape separated into the two partial portions arranged in the circumferential direction, and the two partial portions of the positioning jig can be more easily moved in the radial direction on the lateral face of the hub flange on the vehicle inboard side so that the positioning jig is attached and detached, by a movement unit having a simple structure.

According to the above aspect, it is possible to provide the method for easily assembling the wheel bearing apparatus that is excellent in sealing performance, the method making it possible to prevent the occurrence of the excess and deficiency of the interference between the side lip and the slinger in the sealing unit in the assembling step.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
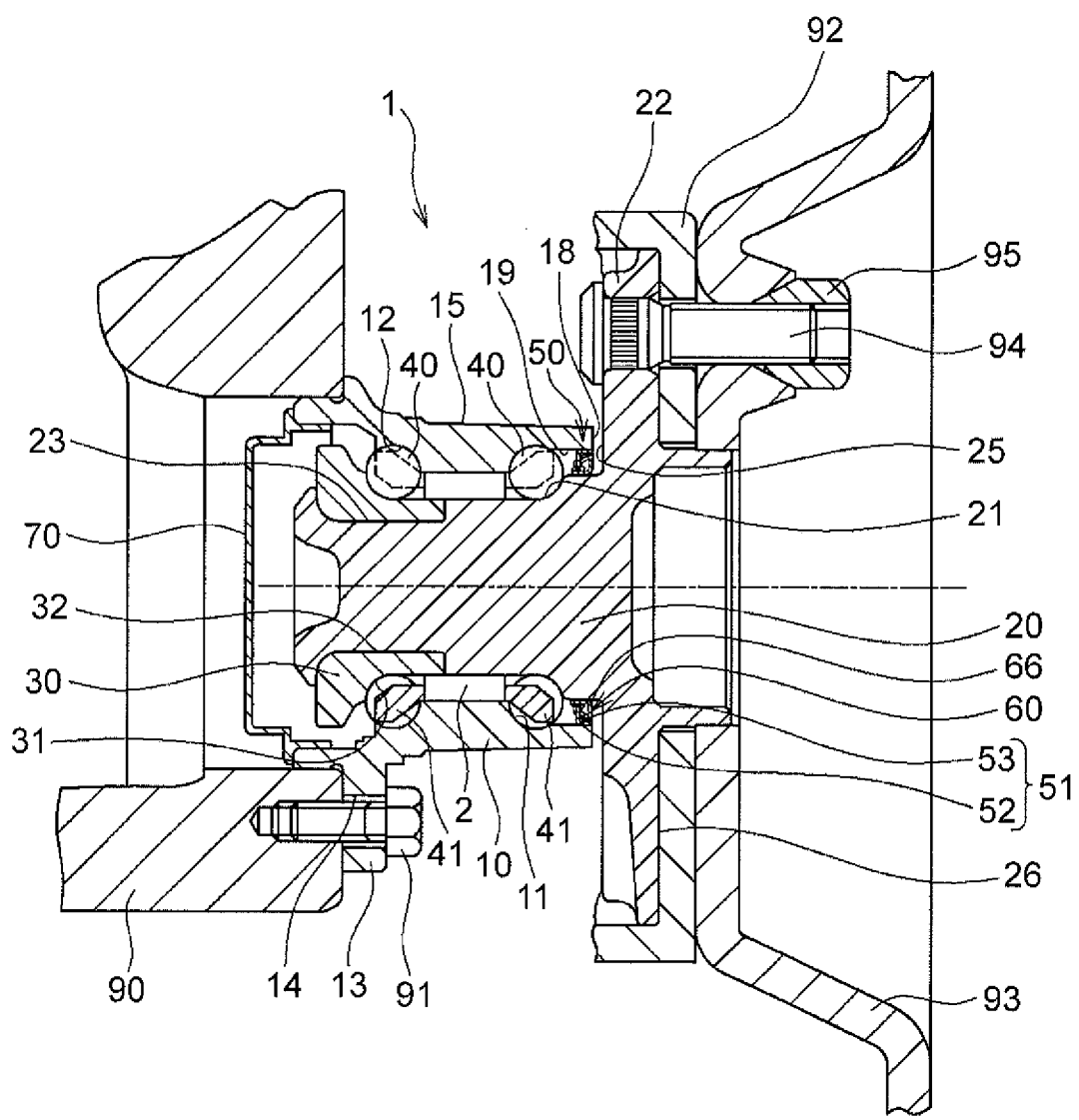
FIG. 1 is a sectional view of a wheel bearing apparatus relating to a method for assembling a wheel bearing apparatus according to an embodiment of the invention.
Figure 2:
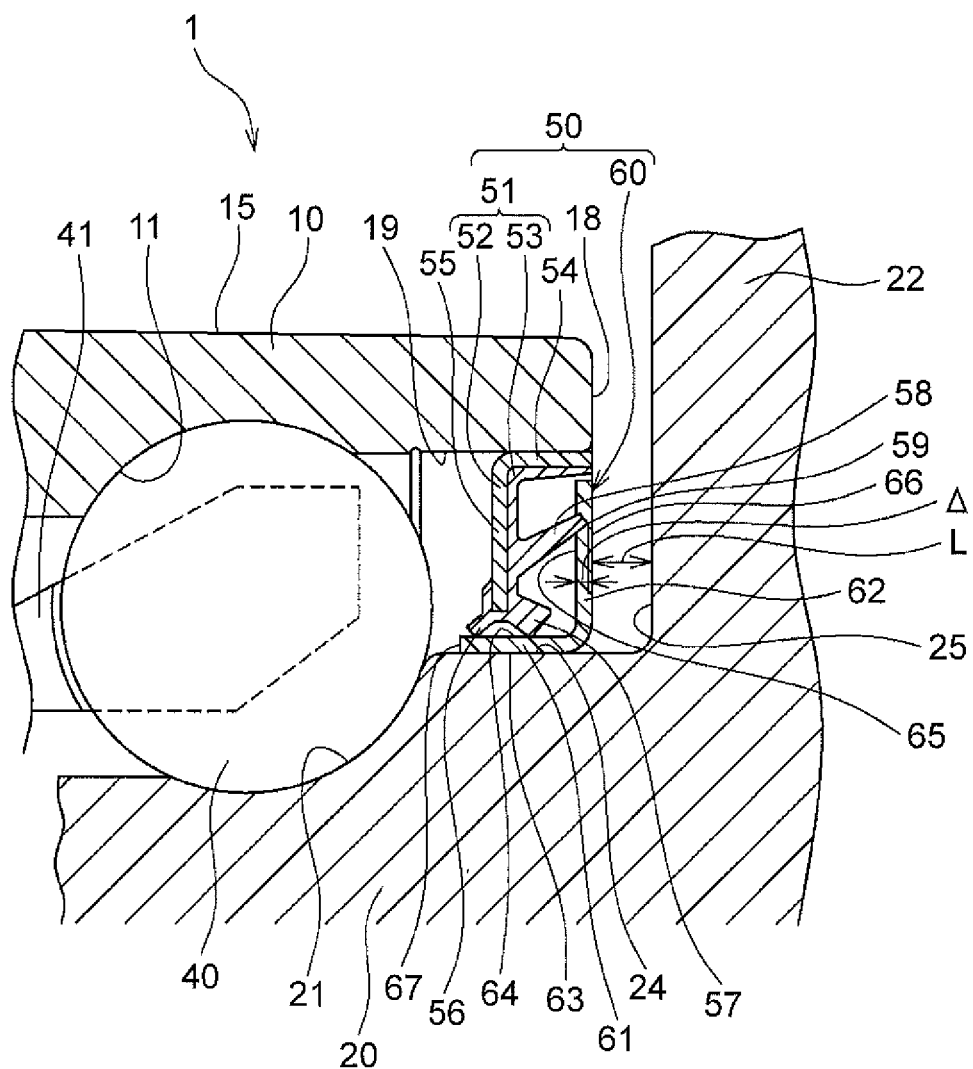
FIG. 2 is an enlarged sectional view of a sealing unit of the wheel bearing apparatus relating to the method for assembling the wheel bearing apparatus according to the embodiment of the invention.
Figure 3:
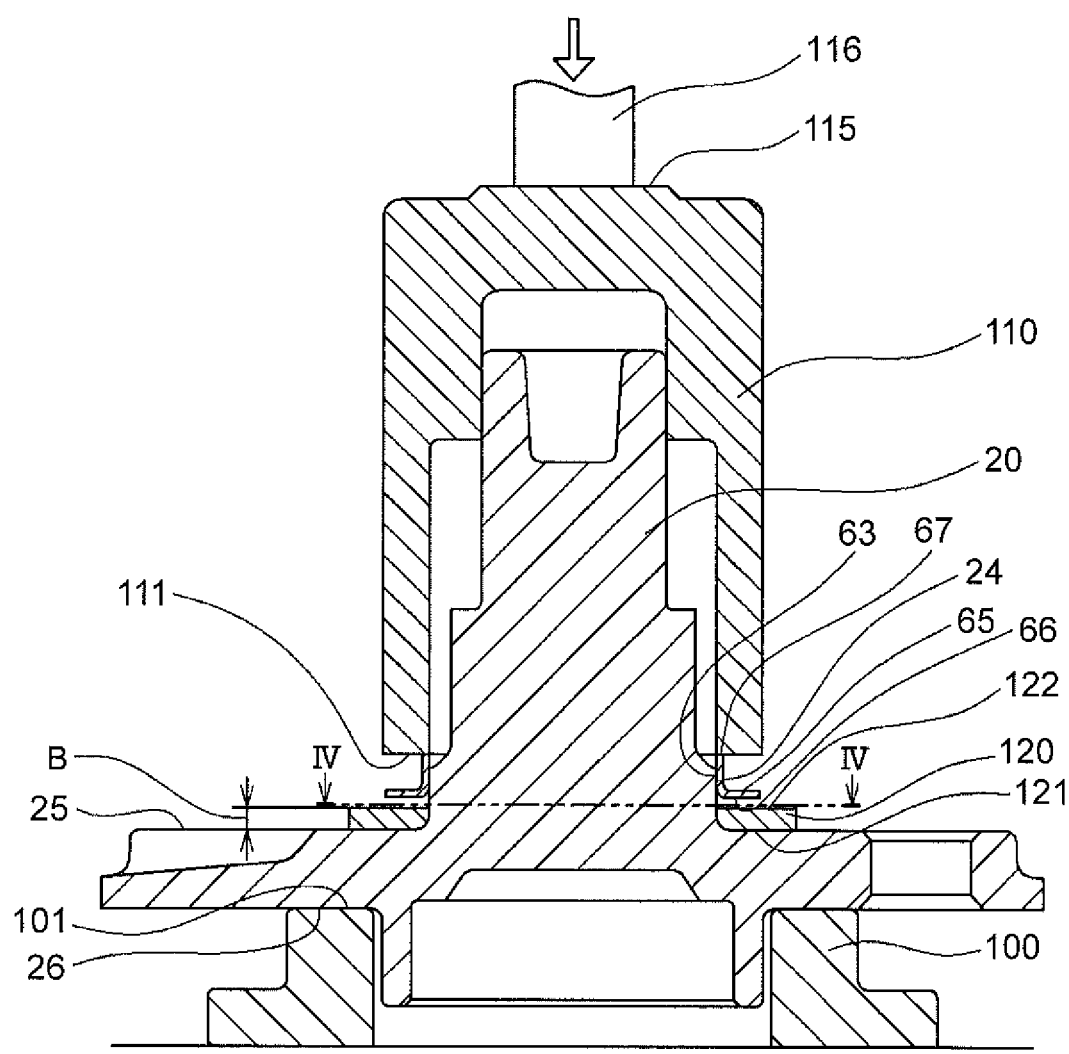
FIG. 3 is an explanatory view for explaining the method for assembling the wheel bearing apparatus according to the embodiment of the invention.
Figure 4:
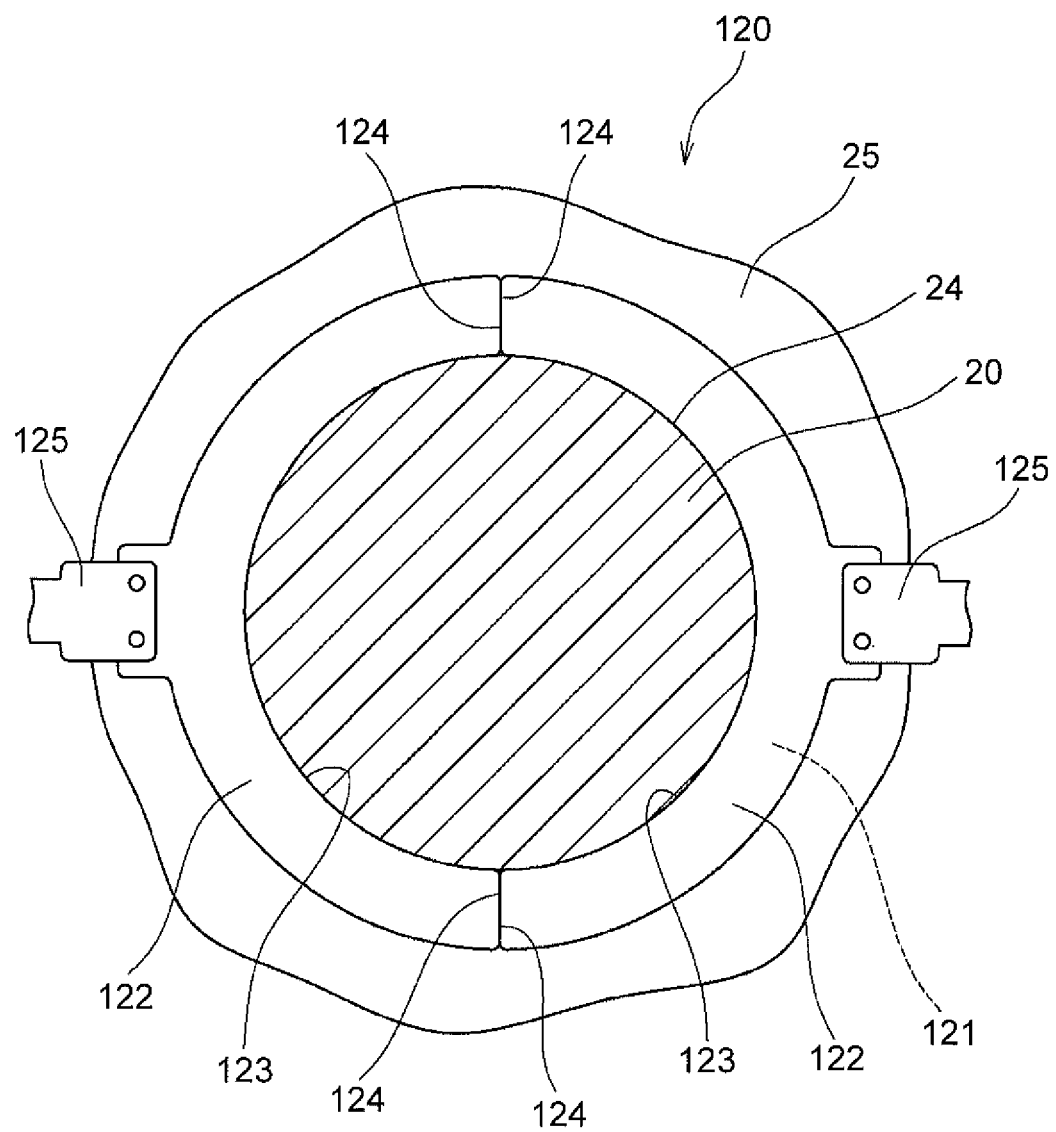
FIG. 4 is a plan view of a positioning jig used for the method for assembling the wheel bearing apparatus according to the embodiment of the invention.

An embodiment of the invention will be described with reference to the drawings. In FIGS. 1 and 2, the right side indicates an outboard side, while the left side indicates an inboard side. In FIGS. 3 and 4, the lower side indicates the outboard side, while the upper side indicates the inboard side. In this specification, "inboard side" means the side closer to the center line of a vehicle in the vehicle-width direction, and "outboard side" means the side farther from the center line of the vehicle in the vehicle-width direction. Note that, "inboard side" and "outboard side", will be used to describe the relative positional relationship between two or more elements in the vehicle-width direction.

FIG. 1 is a sectional view of a wheel bearing apparatus 1 in an axial direction thereof relating to a method for assembling a wheel bearing apparatus according to the embodiment of the invention. FIG. 2 is an enlarged sectional view of a sealing unit of the wheel bearing apparatus 1 relating to the method for assembling a wheel bearing apparatus according to the embodiment of the invention shown in FIG. 1. In FIGS. 1 and 2, the wheel bearing apparatus 1 includes an outer ring member 10, a hub spindle 20, an inner ring 30, balls 40 serving as a plurality of rolling elements, and two cages 41.

The outer ring member 10 includes two rows of outer ring raceways 11 and 12 on its inner periphery. The hub spindle 20 includes a first inner ring raceway 21 on its outer periphery. The inner ring 30 includes a second inner ring raceway 31 on its outer periphery. The balls 40 serving as the two rows of the rolling elements roll between the first outer ring raceway 11 on one side of the outer ring member 10 and the first inner ring raceway 21 of the hub spindle 20 and roll between the second outer ring raceway 12 on the other side of the outer ring member 10 and the second inner ring raceway 31 of the inner ring 30. The two cages 41 retain the two rows of the balls 40 at a prescribed interval.

Bearing inner space 2 is formed between the outer peripheries of the hub spindle 20 and the inner ring 30 and the inner periphery of the outer ring member 10. Grease is provided in the bearing inner space 2 as lubricant. The bearing inner space 2 is separated from the outside by a sealing unit 50 arranged at an opening on the side of a hub flange 22, i.e., an opening on the outboard side and by a cap 70 fixed to an end of the outer ring member 10 on the inboard side.

The outer ring member 10 is made of alloy steel such as S55C. The outer ring member 10 is a ring-shaped body and includes a fixation flange 13 at an end of the outer periphery thereof on the inboard side. The fixation flange 13 extends outward in a radial direction such that the diameter of the outer ring member 10 is increased at the fixation flange 13. The fixation flange 13 is used to attach the wheel bearing apparatus 1 to a vehicle body member 90. In addition, the outer ring member 10 has an outer ring outer peripheral face 15 extending from the fixation flange 13 to the outboard side. The fixation flange 13 has a plurality of through-holes 14. Attachment bolts 91 penetrate (extend through) the plurality of through-holes 14. On the inner periphery of the outer ring member 10, the first outer ring raceway 11 and the second outer ring raceway 12 are provided on the outboard side and the inboard side, respectively.

The end of the outer ring member 10 on the outboard side is an outer ring end face 18. A sealing fitting face 19 is provided at an end of the inner periphery of the outer ring member 10 on the outboard side.

The hub spindle 20 is made of alloy steel such as S55C. The hub spindle 20 includes the hub flange 22 at an end of the outer periphery thereof on one side in the axial direction, i.e., the end of the outer periphery thereof on the outboard side. The hub flange 22 extends outward in the radial direction such that the diameter of the hub spindle 20 is increased at the hub flange 22. A plurality of hub bolts 94 for fixing a brake disc 92 and a wheel 93 are embedded in the hub flange 22. In FIG. 1, the brake disc 92 and the wheel 93 are attached to the wheel bearing apparatus 1.

An inner ring fitting face 23 is provided at an end of the outer periphery of the hub spindle 20 on the other side in the axial direction, i.e., the end of the outer periphery of the hub spindle 20 on the inboard side. The inner ring fitting face 23 has a diameter smaller than that of the adjacent outer peripheral face of the outer periphery of the hub spindle 20 on the one side in the axial direction. The first inner ring raceway 21 is provided on the outer periphery between the hub flange 22 and the inner ring fitting face 23. The shoulder outer peripheral face between the first inner ring raceway 21 and the base of the hub flange 22 on the inboard side has a cylindrical shape parallel to the axis line and serves as a slinger press-fitting face 24 (hereinafter, the slinger-press-fitting face 24 may be referred to as "shoulder outer peripheral face 24"). A face 25 facing (opposed to) a slinger (hereinafter called the opposed face 25) is provided at the lateral face of the hub flange 22 on a slinger side, the lateral face extending outward in the radial direction from the end of the slinger press-fitting face 24 on the outboard side. The opposed face 25 is a surface extending at a right angle with respect to the axis line.

The inner ring 30 is a ring-shaped body made of bearing steel such as SUJ2. The inner ring 30 has the second inner ring raceway 31 at the center of the outer periphery thereof in the direction of the axis line and has an inner face 32 concentric with the second inner ring raceway 31 on the inner periphery thereof. The inner face 32 of the inner ring 30 is fitted onto the inner ring fitting face 23 of the hub spindle 20, and the end face of the inner ring 30 on one side is crimped by clinching the end of the hub spindle 20 on the inboard side, and thus, the inner ring 30 is fixed to the hub spindle 20.

The sealing unit 50 is constituted by a sealing member 51 and a slinger 60. The sealing member 51 includes a core 52 and a sealing portion 53 integrally formed with the core 52 by vulcanization. The core 52 is made of metal and is a ring-shaped body made of metal such as a steel plate. The core 52 includes a cylindrical portion 54 fitted to the sealing fitting face 19 of the outer ring member 10 and includes a flat-plate portion 55 that extends inward in the radial direction from an end of the cylindrical portion 54 on the inboard side such that the inner periphery of the core 52 is decreased at the flat-plate portion 55.

The sealing portion 53 is made of synthetic rubber such as nitrile rubber (NBR). The sealing portion 53 includes an auxiliary lip 56 provided on the inboard side and a main lip 57 provided on the outboard side, with respect to an inner side of the flat-plate portion 55 of the core 52 in the radial direction. In addition, the sealing portion 53 includes a side lip 58 provided on the outboard side with respect to the flat-plate portion 55. The side lip 58 extends toward the outboard side such that the diameter of the side lip 58 increases toward the outboard side. The sealing member 51 is fixed to the outer ring member 10 such that the cylindrical portion 54 of the core 52 is fitted to the sealing fitting face 19 of the outer ring member 10.

The slinger 60 is made of metal and formed by a metal plate such as a stainless steel plate. The slinger 60 is a ring-shaped body having an L-shaped section and includes a cylindrical portion 61 and a disc portion 62 that extends outward in the radial direction from an end of the cylindrical portion 61 on one side such that the diameter of the slinger 60 is increased at the disc portion 62. The inner periphery of the cylindrical portion 61 is a spindle fitting face 63. The diameter of the spindle fitting face 63 is slightly smaller than that of a slinger press-fitting face 24 of the hub spindle 20. The outer periphery of the cylindrical portion 61 serves as a radial sliding-contact face 64 with which the main lip 57 of the sealing portion 53 is in slide contact. The end face of the cylindrical portion 61 on the inboard side is an inner end face 67 that is a surface extending at a right angle with respect to the axis line.

The lateral face of the disc portion 62 on the side of the sealing portion 53, i.e., on the inboard side is a side-lip sliding-contact face 65 with which the side lip 58 of the sealing portion 53 is in slide contact. The lateral face of the disc portion 62 on the side of the hub flange 22, i.e., on the outboard side is a slinger outer lateral face 66. The slinger 60 is attached to the hub spindle 20 such that the spindle fitting face 63 is fitted onto the shoulder outer peripheral face 24 between the first inner ring raceway 21 and the hub flange 22 in the hub spindle 20.

The inner peripheral distal ends of the auxiliary lip 56 and the main lip 57 of the sealing member 51 are in slide contact with the radial sliding-contact face 64 of the slinger 60. In the side lip 58 of the sealing member 51, a distal end 59 on the side of the disc portion 62, i.e., on the outboard side is in slide contact with the side-lip sliding-contact face 65 of the slinger 60 with an interference. Here, a distance L between the slinger outer lateral face 66 of the slinger 60 and the opposed face 25 of the hub spindle 20 is set such that the interference between the distal end 59 of the side lip 58 and the side-lip sliding-contact face 65 of the slinger 60 becomes an appropriate prescribed interference Δ.

FIG. 3 is an explanatory view for explaining the method for assembling the wheel bearing apparatus according to the embodiment of the invention. FIG. 4 is a plan view of a positioning jig used for the method for assembling the wheel bearing apparatus according to the embodiment of the invention, the plan view being seen in the direction indicated by arrows IV-IV in FIG. 3. The feature of the method for assembling the wheel bearing apparatus according to the embodiment of the invention relates to a method for attaching the slinger 60 to the hub spindle 20. Hereinafter, the method for attaching the slinger 60 to the hub spindle 20 will be described with reference to FIGS. 2, 3, and 4. The method for attaching the slinger 60 to the hub spindle 20 is the feature of the method for assembling the wheel bearing apparatus according to the embodiment of the invention.

A positioning jig 120 is made of a steel material. As shown in FIGS. 3 and 4, the positioning jig 120 is a disc separated into two semi-circle portions, each of which has two separation faces 124 (in other words, the positioning jig 120 is a disc including two partial portions). Both lateral faces of the positioning jig 120 are first and second planes 121 and 122 that extend at a right angle with respect to the axis line. The distance between the first plane 121 and the second plane 122, i.e., a width B of the positioning jig 120 in the axial direction is equal to the distance L between the slinger outer lateral face 66 of the slinger 60 and the opposed face 25 of the hub spindle 20. As described above, the distance L indicates the distance between the slinger outer lateral face 66 and the opposed face 25 at which the interference between the distal end 59 of the side lip 58 and the side-lip sliding-contact face 65 of the slinger 60 becomes an appropriate prescribed interference Δ.

The diameter of an inner peripheral face 123 of the positioning jig 120 is larger than that of the slinger press-fitting face 24 of the hub spindle 20. Each of the partial portions of the positioning jig 120 includes a movement joining portion 125 at one position on its outer periphery. The movement joining portion 125 is joined to a positioning jig movement unit (not shown). The positioning jig movement unit can move the two partial portions of the positioning jig 120 symmetrically in the radial direction on a plane extending at a right angle with respect to the axis line.

A press-fitting jig 110 is a bottomed cup-shaped ring body made of a steel material. The press-fitting jig 110 has a slinger pressing face 111 at a distal end on its open side, the slinger pressing face 111 being a surface extending at a right angle with respect to the axis line. The diameter of the inner periphery of the slinger pressing face 111 is slightly larger than the diameter of the spindle fitting face 63 of the cylindrical portion 61 of the slinger 60. In addition, the press-fitting jig 110 has a pressure receiving face 115 at an end on its bottom side, the pressure receiving face 115 being a surface extending at a right angle with respect to the axis line.

Hereinafter, a procedure for assembling the wheel bearing apparatus according to the embodiment of the invention will be described. As shown in FIG. 3, the hub spindle 20 in which the hub flange 22, the first inner ring raceway 21, the inner ring fitting face 23, the slinger press-fitting face 24, and the like are all separately manufactured is installed on a base 100 such that the lateral face 26 of the hub flange 22 on the outboard side is in contact with an upper face 101 of the base 100.

Next, the two partial portions of the positioning jig 120 are set at symmetrical positions outside the hub spindle 20 in the radial direction such that the first planes 121 are in contact with the opposed face 25 of the hub flange 22. Then, the two partial portions of the positioning jig 120 are moved inward in the radial direction by the movement unit (not shown) with the first planes 121 being in contact with the opposed face 25 of the hub flange 22. In a state where the inner peripheral faces 123 of the positioning jig 120 face the slinger press-fitting face 24 of the hub spindle 20 and the separation faces 124 that face each other are in contact with each other, the movement of the positioning jig 120 is stopped to finish the arrangement of the positioning jig 120.

Next, the slinger 60 is supplied using a slinger retention and movement unit (not shown) such as a component supply robot to be arranged such that the end of the spindle fitting face 63 of the slinger 60 on the outboard side contacts the end of the slinger press-fitting face 24 of the hub spindle 20 on the inboard side.

The press-fitting jig 110 is moved by a press-fitting jig movement unit (not shown) from above the inboard side of the hub spindle 20 toward the outboard side of the hub spindle 20 along the axis line. Next, a pressing spindle 116 is extended toward the outboard side, and the press-fitting jig 110 is moved toward the outboard side until the slinger pressing face 111 of the press-fitting jig 110 contacts the inner end face 67 of the slinger 60. When the press-fitting jig 110 is further moved toward the outboard side to press the slinger 60 toward the outboard side, the spindle fitting face 63 of the slinger 60 is moved toward the outboard side on the slinger press-fitting face 24 of the hub spindle 20 to press-fit the slinger 60.

When the press-fitting jig 110 is moved toward the outboard side and the slinger outer lateral face 66 of the slinger 60 comes in contact with the second planes 122 of the positioning jig 120, the press-fitting jig movement unit (i.e., a cylinder (not shown)) is stopped. When the press-fitting jig movement unit is stopped, the extension of the pressing spindle 116 and the movement of the press-fitting jig 110 are stopped. Thus, the attachment of the slinger 60 to the hub spindle 20 is finished.

After the attachment of the slinger 60 is finished, the pressing spindle 116 is contracted toward the inboard side along the axis line and the press-fitting jig 110 is moved by the movement unit (not shown) toward the inboard side along the axis line to be distant from the hub spindle 20. In addition, the two partial portions of the positioning jig 120 are separated from the hub spindle 20 (i.e., the two partial portions are moved away from the hub spindle 20) in an order reverse to the order of setting the two partial portions of the positioning jig 120 with respect to the hub spindle 20.

As described above, according to the embodiment of the invention, the distance between the slinger outer lateral face 66 of the disc portion 62 of the attached slinger 60 and the opposed face 25 of the hub flange 22 is equal to the width B of the positioning jig 120 in the axial direction, and the distance is accurately maintained. Here, the width B of the positioning jig 120 in the axial direction is equal to the distance L between the slinger outer lateral face 66 of the disc portion 62 and the opposed face 25 of the hub flange 22, the distance L being set such that the interference between the end 59 of the side lip 58 on the outboard side and the side-lip sliding-contact face 65 of the disc portion 62 of the slinger 60 becomes the appropriate interference Δ.

That is, the interference between the end 59 of the side lip 58 on the outboard side and the side-lip sliding-contact face 65 of the disc portion 62 of the slinger 60 becomes substantially equal to the appropriate prescribed interference Δ after the assembling of the sealing unit 50 is finished, and the occurrence of the excess and deficiency of the interference can be prevented by the step of attaching the slinger 60 to the hub spindle 20.

In addition, the positioning jig 120 has the ring shape separated into the two partial portions arranged in its circumferential direction. The positioning jig 120 can be easily moved in the radial direction on the opposed face 25 of the hub flange 22 on the inboard side by the movement unit having a simple structure so that the positioning jig 120 is attached and detached.

According to the embodiment of the invention, the occurrence of the excess and deficiency of the interference between the side lip 58 and the slinger 60 in the sealing unit 50 is prevented in the assembling step. As a result, it is possible to provide the method for easily assembling the wheel bearing apparatus 1 that is excellent in sealing performance.

In the above embodiment, the positioning jig 120 is separated into the two semi-circle portions. In the invention, however, the positioning jig 120 may be separated into any other number of partial portions, for example, four partial portions arranged in the circumferential direction.

In the above embodiment, the press-fitting jig 110 is the bottomed cup-shaped ring body. In the invention, however, the press-fitting jig 110 may be a ring-shaped body separated into a plurality of partial portions arranged in the circumferential direction. In addition, in the above embodiment, the slinger pressing face 111 of the press-fitting jig 110 presses the inner end face 67 of the slinger 60. In the invention, however, the slinger pressing face 111 of the press-fitting jig 110 may press the side-lip sliding-contact face 65 of the slinger 60.

In the above embodiment, the rolling elements are the balls. In the invention, however, the rolling elements may be replaced by other rolling elements such as tapered rollers.

In the above embodiment, the hub spindle 20 and the inner ring 30 are integrated with each other by clinching the end of the hub spindle 20. In the invention, however, the hub spindle 20 and the inner ring 30 may be integrated with each other by other joining methods, for example, nut fastening.

In the above embodiment, the sealing unit 50 includes the auxiliary lip 56, the main lip 57, and one side lip 58. In the invention, however, the sealing unit 50 may be replaced by any of other kinds of sealing units, for example, a sealing unit including a different number of side lips and a sealing unit having no main lip.

The invention is not limited to the above embodiment and may be implemented in various embodiments without departing from the scope of the invention.

What is claimed is:

1. A method for assembling a wheel bearing apparatus, the wheel bearing apparatus including:
    an outer ring member that includes an outer ring raceway on an inner periphery thereof;
    a hub spindle that includes an inner ring raceway on an outer periphery thereof and includes a hub flange at an end thereof on one side in an axial direction, the hub flange extending outward in a radial direction such that a diameter of the hub spindle is increased at the hub flange;
    a plurality of rolling elements that roll between the outer ring raceway of the outer ring member and the inner ring raceway of the hub spindle; and
    a sealing unit that seals an opening of bearing inner space on a side of the hub flange, the bearing inner space being provided between the outer ring member and the hub spindle, the sealing unit including a slinger made of metal and a sealing member that includes a core made of metal and a sealing portion made of synthetic rubber, the slinger including a cylindrical portion that is press-fitted to a shoulder outer peripheral face between the inner ring raceway and the hub flange in the hub spindle, and including a disc portion that extends outward in the radial direction from an end of the cylindrical portion on the side of the hub flange such that a diameter of the slinger is increased at the disc portion, the sealing portion including a side lip that faces the disc portion and extends toward the disc portion such that a diameter of the side lip increases toward the disc portion, and an end of the side lip on a side of the disc portion being in slide contact with a lateral face of the disc portion on a side of the sealing portion with an appropriate interference,
    the method comprising:
    disposing a positioning jig such that a lateral face of the positioning jig on the one side in the axial direction is in contact with a lateral face of the hub flange on a side of the slinger, the positioning jig having a ring shape separated into a plurality of partial portions arranged in a circumferential direction, a width of the positioning jig in the axial direction being equal to a distance between a lateral face of the disc portion on the side of the hub flange and the lateral face of the hub flange on the side of the slinger, and the distance being set to obtain the appropriate interference;
    attaching the slinger to the hub spindle by moving the slinger toward the one side in the axial direction using a press-fitting jig; and
    stopping movement of the slinger to finish attachment of the slinger to the hub spindle when the lateral face of the disc portion of the slinger on the side of the hub flange comes in contact with a lateral face on a second side of the positioning jig in the axial direction.

2. The method for assembling the wheel bearing apparatus according to claim 1, wherein:
    the positioning jig has the ring shape separated into two partial portions arranged in the circumferential direction; and
    the two partial portions of the positioning jig are disposed by moving the two partial portions symmetrically with respect to the hub spindle in the radial direction.

3. The method for assembling the wheel bearing apparatus according to claim 2, wherein, after attachment of the slinger to the hub spindle is finished, moving the two partial portions of the positioning jig away from the hub spindle.

* * * * *